United States Patent [19]

Sluyterman

[11] Patent Number: 5,784,106
[45] Date of Patent: Jul. 21, 1998

[54] BRIGHTNESS UNIFORMITY ON A DISPLAY SCREEN

[75] Inventor: Albertus A. S. Sluyterman, Eindhoven, Netherlands

[73] Assignee: U.S. Philips Corporation, New York, N.Y.

[21] Appl. No.: 643,113

[22] Filed: Apr. 30, 1996

[30] Foreign Application Priority Data

May 9, 1995 [EP] European Pat. Off. ............. 95201187

[51] Int. Cl.⁶ ......................................................... H04N 5/59
[52] U.S. Cl. ........................... 348/380; 348/626; 348/687; 315/386
[58] Field of Search .................................. 315/383, 386, 315/379, 399, 409; 348/380, 381, 626, 678, 687, 806, 807, 315, 673, 629; H04N 5/68, 5/59

[56] References Cited

U.S. PATENT DOCUMENTS

| | | | |
|---|---|---|---|
| 4,300,157 | 11/1981 | Midland | 348/380 |
| 4,701,788 | 10/1987 | Desjardins | 348/383 |
| 4,916,365 | 4/1990 | Arai | 315/383 |
| 5,032,924 | 7/1991 | Brown et al. | 348/759 |
| 5,600,381 | 2/1997 | Griepentrog | 348/626 |

FOREIGN PATENT DOCUMENTS

| | | | |
|---|---|---|---|
| 0567301A2 | 10/1993 | European Pat. Off. | H04N 3/30 |
| 0689347 | 12/1995 | European Pat. Off. | H04N 3/32 |
| 0689347A1 | 12/1995 | European Pat. Off. | H04N 3/32 |

*Primary Examiner*—John K. Peng
*Assistant Examiner*—Jeffrey S. Murrell
*Attorney, Agent, or Firm*—Edward W. Goodman

[57] ABSTRACT

A method for improving brightness uniformity reduces a decrease of light towards the edges of a display screen (10) of a display tube (1). The extent of the decrease of light particularly depends on an increase of the thickness of the glass of the display screen (10) from the center of the display screen (10) to its edges, and on a transmission of the glass. This decrease of light is corrected by causing the deflection rate to decrease (C1, Cs) from the center of the display screen (10) towards its edges.

10 Claims, 2 Drawing Sheets

BRIGHTNESS UNIFORMITY ON A DISPLAY SCREEN

BACKGROUND OF THE INVENTION

1. Field of the Invention

The invention relates to a method and a correction circuit for improving brightness uniformity on a display screen of a display tube, this display tube being further provided with a control electrode, the method comprising the steps of driving the control electrode for generating a modulated electron beam in the display tube in response to a picture signal, and deflecting the modulated electron beam for displaying the picture signal on the display screen.

The invention also relates to a display device provided with such a correction circuit.

2. Description of the Related Art

Picture display devices, provided with a color display tube having a display screen for displaying a picture signal on this screen, an electron gun for generating three electron beams, and a deflection unit which generates horizontal and vertical deflection fields for deflecting the electron beams, are generally known. The three electron beams jointly constitute a composite electron beam which writes lines on the display screen under the control of the deflection unit. The three electron beams are modulated with the picture information for influencing an irradiated quantity of light at each position of the display screen. The quantity of light is notably influenced by a quantity of electrons occurring in the composite electron beam per second at a given position (generally referred to as the value of a beam current). Such known picture display devices have the drawback that the quantity of light decreases towards the edges of the display screen, so that brightness uniformity on the display screen is disturbed. The decrease of light towards the edges of the display screen is particularly caused by a thickness of the glass of the display screen increasing from the center of this screen. The decrease of light becomes more and more manifest now that a transmission of the glass becomes increasingly smaller for improving a black level on the display screen. This disturbed brightness uniformity is, inter alia, visible in a troublesome manner upon modulation of the composite electron beam for writing the display screen with a constant beam current.

SUMMARY OF THE INVENTION

It is inter alia an object of the invention to provide a method and a correction circuit for improving brightness uniformity on a display screen of a display tube, and to provide an improved display device.

To this end, a first aspect of the invention provides a method of improving brightness uniformity on a display screen of a display tube, this display tube being further provided with a control electrode, the method comprising the steps of driving the control electrode for generating a modulated electron beam in the display tube in response to a picture signal, and deflecting the modulated electron beam for displaying the picture signal on the display screen, the picture signal having an aspect ratio which corresponds to an aspect ratio of the display screen, in which the picture signal has an aspect ratio corresponding to an aspect ratio of the display screen, characterized in that the method comprises the further step of influencing the deflection for causing a deflection rate of the modulated electron beam to decrease from the center towards the edges of the display screen. This is in contrary to a usual display device, wherein the deflection rate (the speed of movement of the electron beam across the display screen) is made as constant as possible over the whole display screen to reach a optimal geometry of the displayed information.

A second aspect of the invention provides a display device for for displaying a picture signal, with improved brightness uniformity, on a display screen of a display tube, this display tube being provided with a control electrode, said display device further comprising drive means for driving the control electrode to generate a modulated electron beam in the display tube in response to the picture signal, and deflection means for deflecting the modulated electron beam to display the picture signal on the display screen, characterized in that the display device comprises further correction means for causing a deflection rate of the electron beam to decrease from the center towards the edges of the display screen in such a way that an improved brightness uniformity is obtained.

A third aspect of the invention provides a correction circuit for improving brightness uniformity on a display screen of a display tube, said correction circuit comprising drive means for driving a control electrode for generating a modulated electron beam in the display tube in response to a picture signal, characterized in that the correction circuit further comprises means for causing a deflection rate of the electron beam to decrease from the center towards the edges of the display screen in such a way that an improved brightness uniformity is obtained.

A fourth aspect of the invention provides a method of improving brightness uniformity on a display screen of a display tube, this display tube being further provided with a control electrode, the method comprising the steps of driving the control electrode to generate a modulated electron beam in the display tube in response to a picture signal, and deflecting the modulated electron beam in the line and field directions for displaying the picture signal on the display screen, characterized in that the method comprises the further step of influencing the deflection for causing a deflection rate of the electron beam to decrease from the center towards the edges of the display screen, at least a deflection rate in the line direction being decreased in such a manner, that a decrease of the light output in the line direction at at least one frame position is substantially compensated.

A fifth aspect of the invention provides a method of improving brightness uniformity on a display screen of a display tube, this display tube being further provided with a control electrode, the method comprising the steps of: driving the control electrode for generating a modulated electron beam in the display tube in response to a picture signal, and deflecting the modulated electron beam for displaying the picture signal on the display screen, characterized in that the method comprises the further steps of influencing the deflection for causing a deflection rate of the electron beam to decrease from the center towards the edges of the display screen, and influencing an instant of occurrence of the picture signal for reducing a position error on the display screen.

Improving brightness uniformity on a display screen in this way is based on the recognition that an irradiated quantity of light depends on the rate at which an electron beam is deflected. In fact, a slower electron beam will cause more electrons to land per second at a given position on the display screen so that the quantity of irradiated light increases. By influencing the deflection for causing the deflection rate of the electron beam to decrease towards the edges of the display screen, the quantity of light decreasing towards the edges of the display screen can be entirely, or at least partly compensated.

The invention preferably reduces the decrease of light towards the edges of the display screen without having to increase the beam current. Consequently, a spot size of the modulated electron beam on the display screen is not influenced negatively.

It is known from European Patent Application EP-A-0, 567,301 that the horizontal deflection is slowed down towards the vertical edges of the display screen for displaying picture information having an aspect ratio of 16:9 on a display screen having an aspect ratio of 4:3. As a possibility for achieving this slow-down, an S correction capacitor in series with a line deflection coil is given a too small value. In this way, the picture information, as a whole, fills up the entire display screen without a disturbing geometry distortion occurring in the center of the display screen. This known method of slowing down the horizontal deflection rate towards the vertical edges of the display screen does not have for its object to reduce the decrease of light towards the edges of the display screen.

When completely, or partly, compensating the decrease of light in accordance with the first aspect of the invention, picture information having a given aspect ratio on a display screen having (substantially) the same aspect ratio is displayed, which is in contrast to what is disclosed in EP-A-0,567,301, viz. the compression of a picture signal with an aspect ratio of 16:9 for display on a display screen with an aspect ratio of 4:3. The influence of the deflection rate according to the invention for reducing the decrease of light is dependent on a variation of a glass thickness of the display screen and thus generally has a different course than the influence on the deflection rate in accordance with EP-A-0,567,301 for introducing a desired geometry distortion.

EP-A-0,567,301 further shows an embodiment in which, in a different manner, picture information with an aspect ratio of 16:9 is entirely displayed on a display screen with an aspect ratio of 4:3. In this embodiment, the decrease of the horizontal deflection rate towards the vertical edges of the display screen is combined with an increase of the vertical deflection rate towards the horizontal edges of the display screen. In the subject invention, the vertical deflection rate will have to decrease towards the horizontal edges of the display screen for reducing the decrease of light in the vertical direction if a correction of the decrease of light in the vertical direction is desirable.

By influencing the deflection rate, the picture signal will reach a shifted position on the display screen. An embodiment of a method according to the invention, characterized in that the method comprises the further step of influencing an instant of occurrence of the picture signal for decreasing a position error of the picture signal on the display screen, has the advantage that by influencing an instant of occurrence of the picture signal, the position shift resulting from the non-constant deflection rate is compensated entirely, or partly. The shift in time of the position of occurrence of the picture signal can be achieved by means of known techniques, such as clock modulation or interpolation. In clock modulation, the picture signal is written, for example, at a constant clock into a memory and read from the memory at a variable clock. In interpolation, a presented picture signal is processed by means of an interpolation algorithm into a picture signal which provides the correct information at a shifted instant.

An embodiment of a method of improving brightness uniformity as noted above, characterized in that the deflection is performed in a line and field direction and in that the deflection is influenced by causing a deflection rate in the line direction to decrease from the center towards the edges of the display screen, modulates the deflection rate in the line direction only. This has the advantage that the shift in time of the picture information can be realized in a simple manner by means of, for example, line memories. In conventional deflection, in which lines obtained by means of a horizontal deflection succeed each other vertically, the deflection in the line direction is understood to be the horizontal deflection. In transposed scanning, in which vertical columns obtained by vertical deflection succeed each other horizontally, the deflection in the line direction is understood to be the vertical deflection.

An embodiment of a method of improving brightness uniformity as noted above, characterized in that the decrease of the deflection rate in the line direction depends on a position on the display screen in the field direction, is based on a possible different variation in the line direction of the glass thickness at different frame positions on the display screen. This provides a better compensation of the decrease of light.

In an embodiment of a method of improving brightness uniformity as noted above, characterized in that the decrease of the deflection rate from the center towards the edges of the display screen overcompensates a decrease of a light output on the display screen towards its edges, and in that the method comprises the further step of generating a correction waveform which influences the modulated electron beam for obtaining a corrected modulated electron beam which from the center towards the edges of the display screen comprises fewer electrons per second than the modulated electron beam, the deflection towards the edges of the display screen is slowed down to a larger extent than is necessary for compensating the decrease of light. The resultant increase of the quantity of light on the display screen towards its edges is entirely or partly compensated by causing the beam current to decrease towards the edges of the display screen. To this end, a correction waveform influences the modulated beam current for obtaining a corrected modulated beam current which comprises fewer electrons per second towards the edges of the display screen than the modulated beam current. By decreasing the modulated beam current towards the edges of the display screen, the advantage is obtained that a growth of the spot size (referred to as spot growth) towards the edges of the display screen is limited. The spot is an image of the modulated electron beam on the display screen. The decrease of the modulated beam current can be achieved, for example, by controlling the amplitude of the picture signal by means of a known contrast control, or by controlling a DC level of the picture signal by means of a known brightness control.

An embodiment of a display device according to the invention, characterized in that the deflection means comprises a line deflection coil and the correction means includes an S-correction capacitor which is arranged in series with the line deflection coil, the S-correction capacitor having a smaller value than a nominal value for causing the deflection rate of the electron beam to decrease from the center towards the edges of the display screen, said nominal value being associated with a substantially constant deflection rate, is based on the recognition that good results in many display tubes are achieved with respect to a reduction of the decrease of light towards the edges of the display screen by means of a parabolic correction of the deflection rate. Such a decrease of the deflection rate can be realized in a simple manner by giving the S-correction capacitor in series with the relevant deflection coil a suitable, too small value.

In accordance with the fourth aspect of the invention, a variation of at least a deflection rate in the line direction is influenced for substantially compensating the decrease of light towards the edges of the display screen so as to improve the brightness uniformity. For substantially compensating the decrease of light according to the invention, a different course of the decrease of the deflection rate in the line direction is desired than for compressing a picture signal with an aspect ratio of 16:9 for display on a display screen with an aspect ratio of 4:3 in accordance with EP-A-0,567,301.

For improving the brightness uniformity in accordance with the fifth aspect of the invention, the deflection is influenced for causing the deflection rate of the electron beam to decrease towards the edges of the display screen. A position error of the picture information caused by influencing the deflection rate is decreased by influencing an instant of occurrence of the picture signal. As previously stated, a shift in time of the position of occurrence of the picture signal can be obtained by known techniques such as clock modulation or interpolation. In contrast, the object of EP-A-0,567,301 is to introduce a deliberate position error which increases towards the edges of the display screen.

These and other aspects of the invention will be apparent from and elucidated with reference to the embodiments described hereinafter.

DESCRIPTION OF THE PREFERRED EMBODIMENTS

Figure 1:
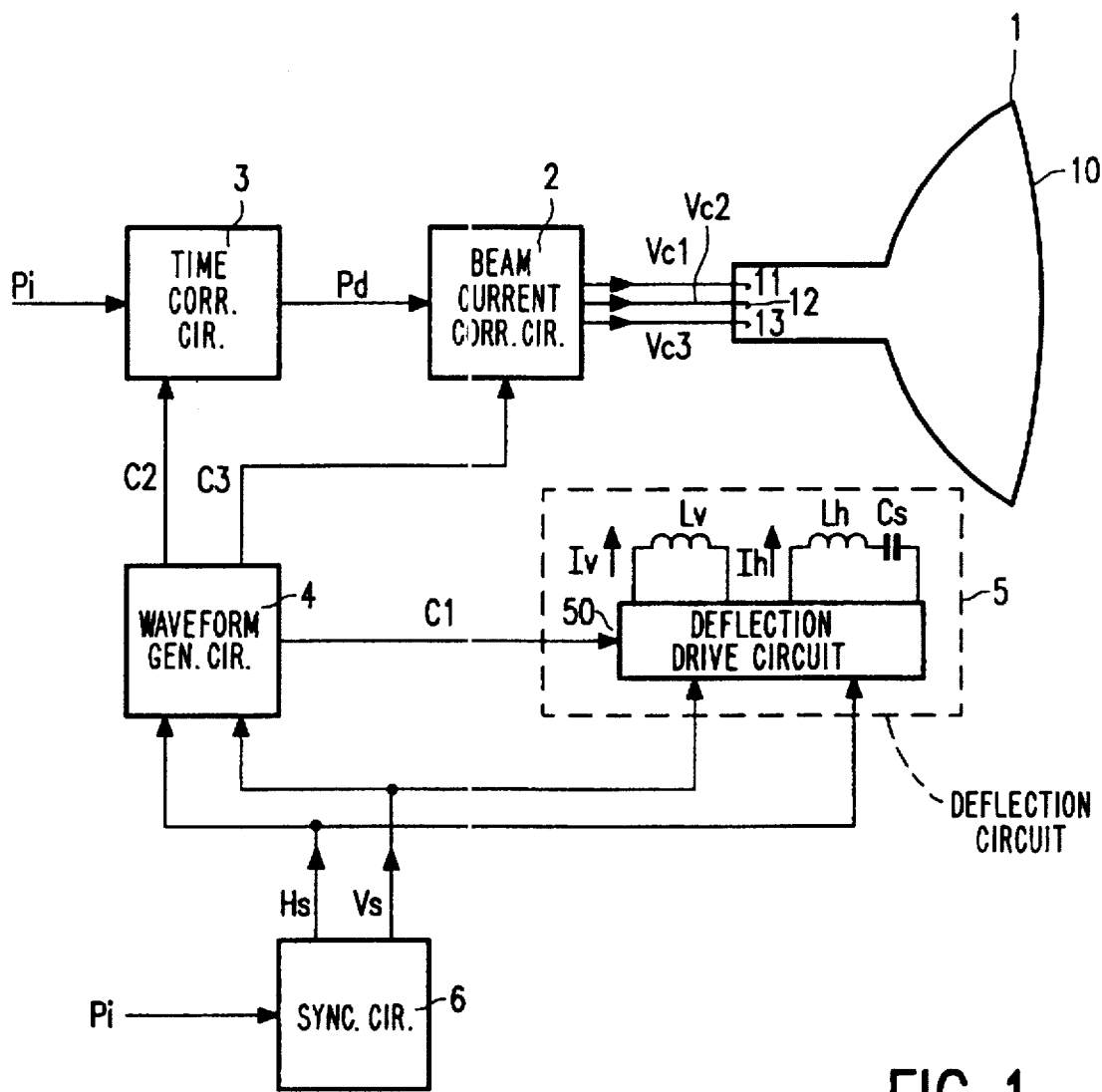
FIG. 1 shows an embodiment of a display device according to the invention.

FIG. 1 shows a display device according to the invention. A color display tube 1 is provided with control electrodes 11, 12, 13 and a display screen 10. The display screen 10 is provided with phosphors (not shown) in the three primary colors. The control signals Vc1, Vc2, Vc3, which are derived from a picture signal Pi, drive the control electrodes 11, 12, 13 for modulating a plurality of electrons in separate electron beams. Each modulated electron beam is related to one of the phosphors. The separate modulated electron beams constitute a modulated composite electron beam. The number of electrons per second in this modulated composite electron beam defines an irradiated quantity of light by the display screen 10. A deflection circuit 5 comprises a field deflection coil Lv, and a line deflection coil Lh, and a deflection drive circuit 50 for driving the field and line deflection coils Lv, Lh. The deflection drive circuit 50 receives vertical synchronizing information Vs and horizontal synchronizing information Hs, which is derived from the picture signal Pi by a synchronizing circuit 6 for generating sawtooth-shaped field and line deflection currents Iv, Ih in the field and line deflection coils Lv, Lh, in synchronism with the picture signal Pi.

A waveform-generating circuit 4 also receives the horizontal and vertical synchronizing information Hs, Hv and applies a first correction waveform C1 to the deflection drive circuit 50, a second correction waveform C2 to a time correction circuit 3 and a third correction waveform C3 to a beam current correction circuit 2. The time correction circuit 3 further receives the picture signal Pi and supplies a time-shifted picture signal Pd. The quantity of time shift is determined by the second correction waveform C2. The beam current correction circuit 2 further receives the time-shifted picture signal Pd and supplies the control voltages Vc1, Vc2, Vc3 for driving the control electrodes of the color display tube. The number of electrons per second in the modulated composite electron beam (further referred to as a value of the beam current) is determined by the third correction signal C3. In the embodiment described, the line deflection current Ih is influenced by the first correction signal C1 for causing a horizontal deflection rate to decrease towards the edges of the display screen 10. It is possible to generate a fourth correction waveform for causing the field deflection current Iv to decrease towards the edges of the display screen 10. By causing the deflection to decrease towards the edges of the display screen 10, the decrease of light is reduced.

The position error of the picture signal Pi, produced by influencing the deflection rate on the display screen 10, can be compensated by means of the second correction waveform C2 via the time correction circuit 3.

It is possible to slow down the deflection 5 towards the edges of the display screen 10 to a larger extent than is necessary for a desired reduction of the decrease of light towards the edges of the display screen 10. The resultant occurring larger quantity of light can be entirely or partly compensated by choosing the shape of the third correction waveform C3 in such a way that the beam current (the number of electrons per second in the modulated composite electron beam) is decreased towards the edges of the display screen 10. The value of the beam current can be influenced, for example, by means of a contrast control adapted for this purpose: the time-shifted picture signal Pd is multiplied by the third correction signal C3. The contrast control can be combined with an existing contrast control in a picture display device, or may be incorporated as an extra feature.

It is further possible to realize the decrease of the deflection rate towards the edges of the display screen by arranging an S-correction capacitor Cs in series with the line deflection coil Lh, or by choosing the value of the S-correction capacitor Cs to be smaller than usual. In these cases, the first correction signal C1 is dispensed with. In generally known circuits, the value of the S-correction capacitor Cs is chosen to be such that a decrease of the voltage across the horizontal deflection coil Lh towards the vertical edges of the display screen 10 is obtained for compensating a too high deflection rate towards the edges of the display screen 10 in the best possible way. This too high deflection rate occurs as a result of the substantial planeness of the display screen 10. In the invention, the value of the S-correction capacitor Cs is chosen to be deliberately smaller than is necessary for a regular deflection, so that the line deflection rate decreases towards the edges of the display screen 10. Also the field deflection rate can be decreased towards the edges of the display screen by generating a field control signal with a too large quantity of S-correction, for example, by means of a waveform generator arranged in the deflection control circuit 50. It is known from EP-A-0,567,301 that the line deflection rate towards the edges of the display screen is slowed down so as to introduce a given geometry distortion, and the extent of correction is thus determined on a different basis.

Figure 2A:
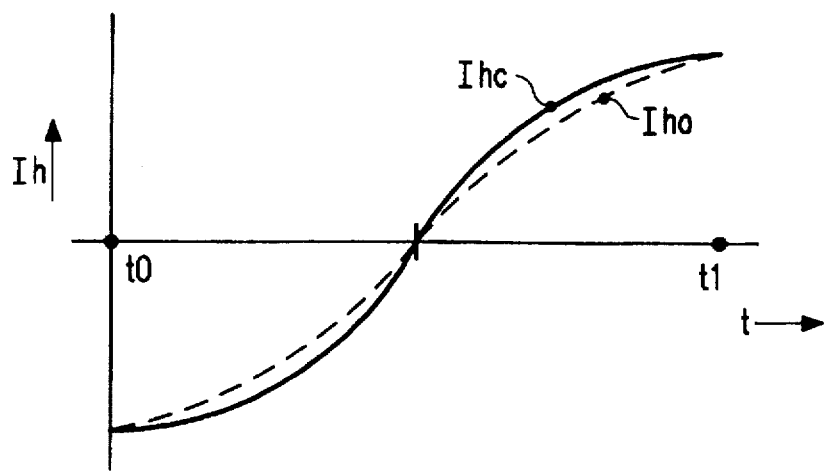
FIGS. 2a–2c shows some waveforms to explain the operation of the display device of FIG. 1.
Figure 2B:
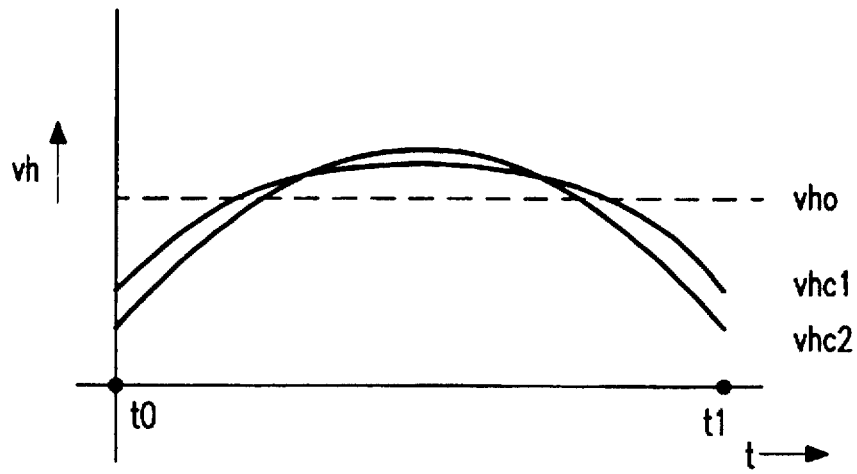
Figure 2C:
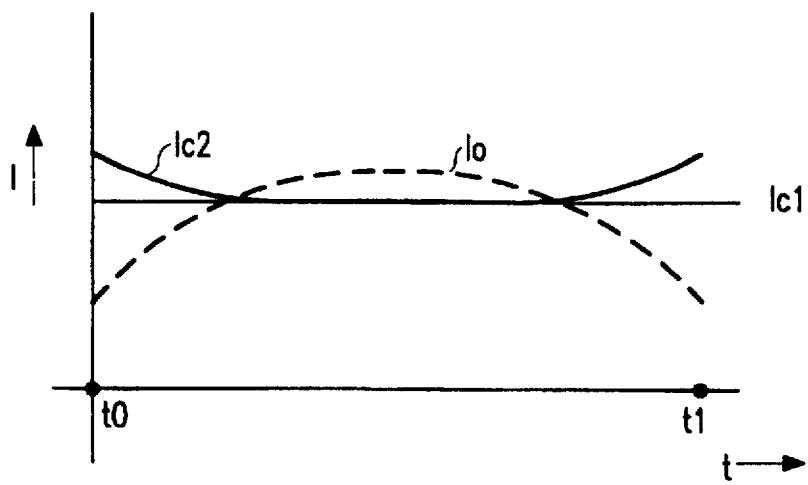

FIG. 2 shows some waveforms to elucidate the operation of the display device of FIG. 1. Each time, a period t0, t1 is shown which corresponds to a horizontal time interval in which a line is written on the display screen 10. The broken line in FIG. 2a shows a horizontal deflection current Iho in accordance with the prior art, provided with an amount of S-correction for writing on the display screen 10 at a (substantially) constant horizontal deflection rate. A corrected horizontal deflection current Ihc having a too large S correction due to an S-correction capacitor Cs chosen to be deliberately too small in accordance with the invention is shown as a solid line curve. FIG. 2b shows the horizontal deflection rate vh, the broken line shows the constant horizontal deflection rate vho associated with the horizontal deflection current Iho in accordance with the prior art. The solid-line curve shows that the corrected horizontal deflection rate vhc1 according to the invention slightly increases in a center of the display screen 10 and decreases towards the edges of the display screen 10. FIG. 2c shows a quantity of light on a line shown at a constant beam current. The broken-line curve lo shows the decrease of light towards the edges of the display screen 10 at a given frame position on the display screen 10, occurring at a constant horizontal deflection rate vho in accordance with the prior art. The solid line lc1 shows the constant quantity of irradiated light occurring at the corrected horizontal deflection rate vhc. It is possible to slow down the deflection rate to a larger extent than is necessary for compensating the decrease of light, see the solid-line curve vhc2 in FIG. 2b. In this case, an increasing quantity of light towards the edges of the display screen 10 is obtained, as is shown by means of the solid-line curve lc2 in FIG. 2c. This increase of light can be compensated by decreasing the beam current towards the edges of the display screen 10. It is of course also possible to slow down the deflection rate to a lesser extent than is required for exact compensation of the decrease of light. The waveforms shown in FIG. 2 are only given by way of example, and also the simple waveforms consisting of, for example, an assembly of line sections are suitable for reducing the spot growth.

It is to be noted that the embodiments described hereinbefore elucidate rather than limit the invention and that those skilled in the art will be able to conceive many alternative embodiments without departing from the scope of the appendant claims. The invention, and notably the waveform-generating circuit 4, the time correction circuit 3 and the beam current correction circuit 2 may be implemented in hardware with various elements or in an integrated circuit and/or by means of a suitably programmed processor, both implementations being within the scope of the invention. The invention may be used for maintaining the quantity of light in the horizontal and/or vertical direction as constant as possible. The reduction of the decrease of light according to the invention is also suitable for display tubes in which one electron beam is used.

I claim:

1. A method of improving brightness uniformity on a display screen of a display tube, said display tube being further provided with a control electrode, the method comprising the steps:

driving the control electrode for generating an intensity modulated electron beam in the display tube in response to a picture signal; and deflecting the intensity modulated electron beam for displaying the picture signal by controlling a number of electrons in said electron beam on the display screen, the picture signal having an aspect ratio which corresponds to an aspect ratio of the display screen, characterized in that the method comprises the further step: influencing the deflecting of the intensity modulated electron beam to cause a deflection rate of the intensity modulated electron beam to decrease gradually from the center towards the edges of the display screen.

2. A method of improving brightness uniformity as claimed in claim 1, characterized in that the method comprises the further step of influencing an instant of occurrence of the picture signal for decreasing a position error of the picture signal on the display screen.

3. A method of improving brightness uniformity as claimed in claim 1, characterized in that the deflecting of the intensity modulated electron beam is performed in a line and field direction, and in that the influencing of the deflecting of the intensity modulated electron beam comprises causing a deflection rate in the line direction to decrease gradually from the center towards the edges of the display screen.

4. A method of improving brightness uniformity as claimed in claim 3, characterized in that the decrease of the deflection rate in the line direction depends on a position on the display screen in the field direction.

5. A method of improving brightness uniformity as claimed in claim 1, characterized in that the decrease of the deflection rate from the center towards the edges of the display screen overcompensates a decrease of a light output on the display screen towards the edges of the display screen, and in that the method comprises the further step:

generating a correction waveform which influences the intensity modulated electron beam for obtaining a corrected intensity modulated electron beam which, from the center towards the edges of the display screen, comprises fewer electrons per second than the intensity modulated electron beam having not been corrected.

6. A display device for displaying a picture signal on a display screen of a display tube, said display tube being provided with a control electrode, said display device further comprising:

drive means for driving the control electrode to generate an intensity modulated electron beam in the display tube in response to the picture signal; and deflection means for deflecting the intensity modulated electron beam to display the picture signal on the display screen, characterized in that the display device further comprises:

correction means for causing a deflection rate of the intensity modulated electron beam to decrease gradually from the center towards the edges of the display screen in such a way that an improved brightness uniformity is obtained.

7. A display device as claimed in claim 6, characterized in that the deflection means comprises a line deflection coil, and the correction means include an S-correction capacitor arranged in series with the line deflection coil, the S-correction capacitor having a value smaller than a nominal value for causing the deflection rate of the electron beam to decrease gradually from the center towards the edges of the display screen, said nominal value being associated with a substantially constant deflection rate.

8. A correction circuit for improving brightness uniformity on a display screen of a display tube, said correction circuit comprising drive means for driving a control electrode of the display tube for generating an intensity modulated electron beam in the display tube in response to a picture signal, characterized in that the correction circuit further comprises means for causing a deflection rate of the electron beam to decrease gradually from the center towards the edges of the display screen in such a way that an improved brightness uniformity is obtained.

9. A method of improving brightness uniformity on a display screen of a display tube, said display tube being further provided with a control electrode, the method comprising the steps:

- driving the control electrode to generate an intensity modulated electron beam in the display tube in response to a picture signal; and
- deflecting the intensity modulated electron beam in line and field directions for displaying the picture signal on the display screen (10), characterized in that the method comprises the further step:
  - influencing the deflecting of the intensity modulated electron beam to cause a deflection rate of the electron beam to decrease gradually from the center towards the edges of the display screen, at least a deflection rate in the line direction being decreased in such a manner that a decrease of the light output in the line direction at a location of at least one frame position is substantially compensated.

10. A method of improving brightness uniformity on a display screen of a display tube, said display tube being further provided with a control electrode, the method comprising the steps:

- driving the control electrode for generating an intensity modulated electron beam in the display tube in response to a picture signal; and
- deflecting the intensity modulated electron beam for displaying the picture signal on the display screen, characterized in that the method comprises the further steps:
  - influencing the deflecting of the intensity modulated electron beam to cause a deflection rate of the electron beam to decrease gradually from the center towards the edges of the display screen; and
  - influencing an instant of occurrence of the picture signal for reducing a position error on the display screen.

* * * * *